(12) United States Patent
Takeda et al.

(10) Patent No.: US 7,486,458 B2
(45) Date of Patent: Feb. 3, 2009

(54) MAGNETIC DISK DRIVE WITH DIAGNOSIS OF ERROR-CORRECTING RETRIES

(75) Inventors: Sumie Takeda, Kanagawa (JP); Akira Kojima, Kanagawa (JP); Mitsuharu Horiuchi, Kanagawa (JP); Shinichi Kobayashi, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 741 days.

(21) Appl. No.: 11/046,322

(22) Filed: Jan. 27, 2005

(65) Prior Publication Data

US 2005/0174677 A1    Aug. 11, 2005

(30) Foreign Application Priority Data

Feb. 10, 2004    (JP) .............................. 2004-032788

(51) Int. Cl.
  *G11B 27/36*    (2006.01)
  *G11B 5/09*    (2006.01)
(52) U.S. Cl. .............................. 360/31; 360/53; 714/705
(58) Field of Classification Search .................. None
  See application file for complete search history.

(56) References Cited

U.S. PATENT DOCUMENTS 6,189,051 B1 *    2/2001  Oh et al. ..................... 717/175
7,042,664 B2 *    5/2006  Gill et al. ..................... 360/31
2003/0011917 A1*    1/2003  Bliss et al. ..................... 360/39

FOREIGN PATENT DOCUMENTS

| JP | 10-011227 | 1/1998 |
| JP | 2002-132534 | 5/2002 |
| JP | 2002-189571 | 7/2002 |
| JP | 05-073446 | 3/2003 |

* cited by examiner

*Primary Examiner*—Jason C Olson
(74) *Attorney, Agent, or Firm*—Townsend and Townsend and Crew LLP; Patrick Duncan

(57) ABSTRACT

Embodiments of the invention relate to diagnosing error-correcting retries of an upper system by using a disk drive under control of the upper system. In one embodiment, a microprocessor can operate in any of at least two operation modes. One is normal operation mode while the other is pseudo failure operation mode. Mode switching is made by a switch. Strictly, the pseudo failure operation mode includes three different operation modes: 1) pseudo logical error report mode in which a pseudo logical error is reported to the upper system without performing disk control; 2) pseudo component circuit failure mode in which a control circuit is forced to cause a failure by setting invalid control values to the control circuits; and 3) pseudo interface failure mode in which a pseudo interface failure in the system comprising multiple disk drives is reported by setting an invalid control value to the interface control circuit.

18 Claims, 3 Drawing Sheets

| | 7 | 6 | 5 | 4 | 3 | 2 | 1 | 0 | |
|---|---|---|---|---|---|---|---|---|---|
| Byte 0 | SP =1 | reserved | Special Page Code | | | | | | Pseudo Error Mode Specified |
| Byte 1 | Page length (0x16) | | | | | | | | |
| Byte 2 | reserved | reserved | reserved | reserved | reserved | Error Mode | | | |
| Byte 3 | reserved | reserved | reserved | reserved | Sense Key | | | | Error Type Specified |
| Byte 4 | Sense Code | | | | | | | | |
| Byte 5 | Additional Sense Qualifier | | | | | | | | |
| Byte 6 | FRU code | | | | | | | | |
| Byte 7 | reserved | reserved | reserved | reserved | W&V | VERIFY | WRITE | READ | Command Specified |
| Byte 8 | reserved | | | | | | | | |
| Byte 9 | reserved | reserved | reserved | reserved | reserved | reserved | ETP mode1 | ETP mode0 | |
| Byte 10 | ETP bit map Length (Max 0x10) | | | | | | | | No. of Error Repeat Times before Recovery Specified |
| Byte 11 | MSB ETP bit Map | | | | | | | | |
| Byte 12 | (LSB) | | | | | | | | |
| Byte 13 | Delay from EIM=1 to start EIM (unit : sec) | | | | | | | | |
| Byte 14 | reserved | | | | | | | | |
| Byte 15 | reserved | | | | | | | | |
| Byte 16 | MSB | | | | | | | | |
| Byte 17 | | | | | | | | | |
| Byte 18 | Start LBA | | | | | | | | |
| Byte 19 | LSB | | | | | | | | Error Area Specified |
| Byte 20 | MSB | | | | | | | | |
| Byte 21 | | | | | | | | | |
| Byte 22 | End LBA | | | | | | | | |
| Byte 23 | LSB | | | | | | | | |

MAGNETIC DISK DRIVE WITH DIAGNOSIS OF ERROR-CORRECTING RETRIES

CROSS-REFERENCES TO RELATED APPLICATIONS

This application claims priority from Japanese Patent Application JP 2004-032788, filed Feb. 10, 2004, the entire disclosure of which is incorporated herein by reference.

BACKGROUND OF THE INVENTION

The present invention relates to a magnetic disk drive and particularly to a technique for diagnosing error-correcting retries of the upper system from the magnetic disk drive.

There have been many patented techniques which diagnose magnetic disk drives by issuing commands and the like from the upper systems. They include highly flexible diagnosis methods. One known example is described in Japanese Patent Laid-Open No. 2002-189571. In this method, it is possible for the upper system to specify to the magnetic disk drive what failures are to stop the self-diagnosis if detected.

In addition, Japanese Patent Laid-Open No. 10-011227 describes a method which allows a diagnosis program on the upper system to be executed/controlled so as to perform write read test for every magnetic disk. This diagnosis capability covering all magnetic disks raises the reliability of the magnetic disk drive.

As for techniques for diagnosing the upper system from the magnetic disk drive, error-correcting retries of the upper system are conventionally verified by using a prepared disk drive which actually generates failures. In this case, preparing disk drives which generate all errors required by the upper system is not feasible since this needs tremendous man-hours.

As for logical pseudo failures, techniques which use simulators such as pseudo input and output devices are known. As described in Japanese Patent Laid-Open No. 5-73446 and No. 2002-132534, such a simulator provides pseudo execution of operations without using an actual device and can report pseudo logical errors required by the upper system. However, to verify various error-correcting retries of the actual upper system, not only what each error is but also how many times retry is to be done for the error are important. Uncertain composite errors each resulting from a combination of recoverable and unrecoverable failures must be simulated. Although composite errors can be composed logically even by a simulator, this requires tremendous man-hours and costs. In addition, since an actual device is not used, non-logical errors such as those due to failed components cannot be simulated.

BRIEF SUMMARY OF THE INVENTION

The present invention is directed to diagnosing error-correcting retries of a disk drive's upper system by using the disk drive.

Aimed at raising the reliability of data stored in a magnetic disk drive, its upper system performs various error-correcting retries. Control of the disk drive, when a retry is done, may differ depending on not only how the retry is done but also how may times the retry is repeated. To verify such complex error-correcting retries of the upper system, the magnetic disk drive must satisfy the following two basic requirements: (a) capable of reporting every error consistently with the diagnosis condition of the upper system; and (b) capable of controlling the number of error-correcting retry times in the disk drive as requested by the upper system.

In the case of a multi-disk drive system, the following requirement must also be satisfied: (c) capable of generating a pseudo error in another disk drive.

Although such prior techniques as described in Japanese Patent Laid-Open No. 5-73446 and No. 2002-132534 can report pseudo logical errors required by the upper system, errors due to failed components in the disk drive cannot be reported since no actual device is not used by the simulator. In addition, to simulate composite errors induced by a combination of recoverable and unrecoverable failures, the requirement (b) must be satisfied. Although composite errors can be composed logically even by a simulator, this requires tremendous man-hours and costs. Further, the requirement (c) cannot be satisfied by the disk drive according to any of the prior techniques since only the errors local to the disk drive itself are referred to as reported logical errors.

It is also impossible to satisfy the aforementioned requirements by using a magnetic device which actually generates failures as conventional since:

(1) Unexpected failures not related to the diagnosis of the upper system may occur since error control is not possible.
(2) It is not possible to perform verification for all of many errors which may occur in the magnetic disk drive.
(3) Retry control is not possible. For example, it is not possible to change the number of times an error is to be reported successively in response to a command retried as many times from the upper system.

Accordingly, a feature of the present invention is to solve the problems involved in the aforementioned prior techniques and satisfy the requirements (a), (b) and (C) of the upper system by configuring the magnetic disk drive in such a manner that: the magnetic disk drive operates either in normal mode or in pseudo failure mode; and in the pseudo failure mode, the magnetic disk drive reports a pseudo error or artificially generates a failed electrical component according to the diagnosis condition of the upper system in order to verify the error-correcting retries of the upper system.

In addition to pseudo errors local to the drive itself, another feature of the present invention is to make it possible to generate pseudo errors in other disk drives in a multi-disk drive system.

In accordance with an aspect of the present invention, a magnetic disk drive has a mechanism capable of receiving a command from an upper system and transmitting an error, characterized in that the disk drive has two operation modes where one is a normal operation mode while the other is a pseudo failure mode in which a pseudo error is reported; and means to select one of the two operation modes.

In some embodiments, there is provided a switching mechanism for switching the magnetic disk drive between the two operation modes. The switching mechanism can be controlled from the upper system. There may be provided a parameter setting module for specifying in the pseudo failure mode what type of pseudo error is to occur, how many times the pseudo error is to repeat before recovery, the number of times of recovery, and where the pseudo error is to occur and so on.

In specific embodiments, the magnetic disk drive further includes a module for artificially causing a failed electrical component in the pseudo failure mode. A system may comprise plural magnetic disk drives, characterized in that one of the magnetic disk drives, while operating in the pseudo failure mode, can generate pseudo errors in the other disk drives.

Since switching is possible between the normal operation mode and the pseudo error report mode, a) error-correcting retries of the upper system can be verified only by connecting an approved disk drive product and selecting the pseudo error report mode, and b) after the verification is complete, the disk drive used for the verification can be put to normal use only by selecting the normal operation mode without the necessity of recovering the disk drive from a failure. That is, since either operation mode can be selected, it is not necessary to prepare dedicated defective disk drives as conventional. Error-correcting retries of the upper system can be verified by using an approved disk drive product.

In addition, because an error can be reproduced flexibly according to the diagnosis condition of the upper system and a pseudo error occurrence area can be specified, it is possible to prevent an error from occurring in a system area and causing an unexpected phenomenon. Such an undesired situation may occur if a defective disk drive is used.

Further, since the number of error/retry repeat times can be specified, recovery verification can easily be performed to check how many retries are required for recovery. This also makes it possible to simulate uncertain composite errors each resulting from a combination of recoverable and unrecoverable failures.

Further, because it is possible to artificially cause a specific electric circuit to malfunction at a timing requested by the upper system, a defective component can be simulated. Since this can be attained only by changing the control constant of the electrical circuit to an invalid value, the man-hours and costs can advantageously be reduced.

If multiple disk drives are connected to the upper system, it is possible to change a constant of an input/output transceiver or receiver of one disk drive so as cause an interface failure in other disk drives. In the case of the conventional simulating and other methods, such interface failures can not be simulated since each disk drive can treat only logical errors which are local to itself.

BRIEF DESCRIPTION OF THE DRAWINGS

FIG. 3 schematically shows an example of a table used by a disk drive of the present invention in order to determine how and what pseudo error is to be generated.

DETAILED DESCRIPTION OF THE INVENTION

The following describes an embodiment of the present invention with reference to the drawings.

Figure 1:
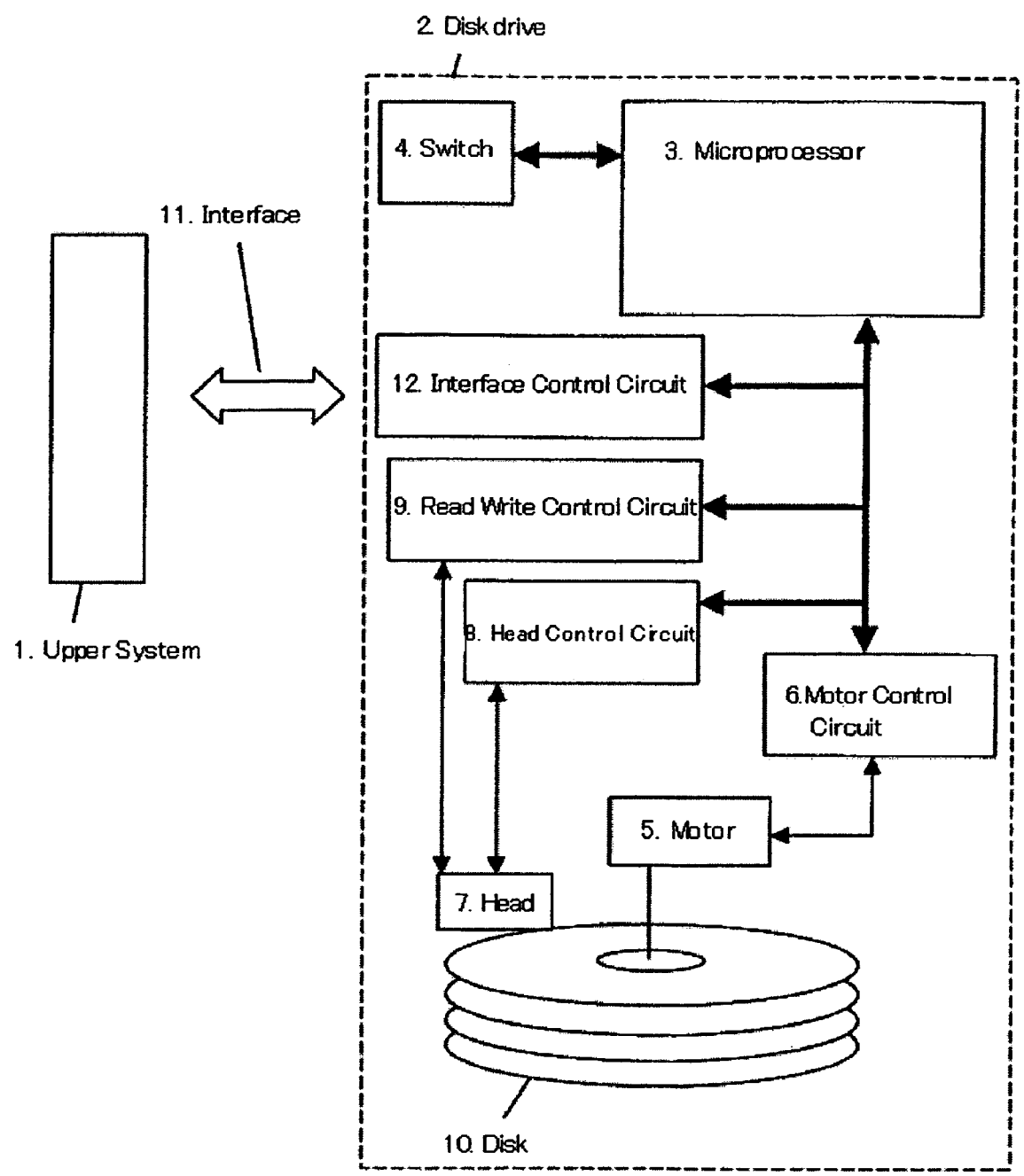
FIG. 1 schematically shows a configuration of a disk drive according to an embodiment of the present invention.

FIG. 1 schematically shows a configuration of a magnetic disk drive according to an embodiment of the present invention. In FIG. 1, reference numerals 1 and 2 respectively denote an upper system and a disk drive which are connected by an interface 11. The disk drive 2 comprises: disks 10, recording media; a motor 5 which rotates the disks 10; a motor control circuit 6 which drives and controls the motor 5; heads 7 which write or read signals to or from the disks 10; a head control circuit 8 which controls the positioning of the heads 7; a read write control circuit 9 to control writing or reading signals to or from the disks 10; and an interface control circuit 12 which controls the interface 11 with the upper system 1 or with another disk drive 2. These control circuits 6, 8, 9 and 12 are connected to a microprocessor 3. A selector switch 4 which is operable according to a command from the upper system is connected to the microprocessor 3.

The microprocessor 3 has two operation modes. One is normal operation mode and the other is pseudo failure or abnormal operation mode. Either operation mode can be selected by operating the switch 4. Further, the pseudo abnormal operation mode includes three different operation modes. The first is a pseudo logical error report mode in which a pseudo logical error is reported to the upper system 1 without performing disk control. The second is a pseudo component circuit failure mode in which a control circuit is forced to cause a failure by setting invalid control values to the control circuits 6, 8 and 9. The third is a pseudo interface failure mode in which a pseudo interface failure in the system comprising multiple disk drives is reported by setting an invalid control value to the interface control circuit 12.

Any of these modes can be selected by operating the switch 4 connected to the microprocessor 3. Although this switch 4 is implemented as a switch circuit in the configuration of the device configuration shown in FIG. 1, it is also possible to implement a switch in an internal memory 13 as shown in FIG. 2.

Figure 2:
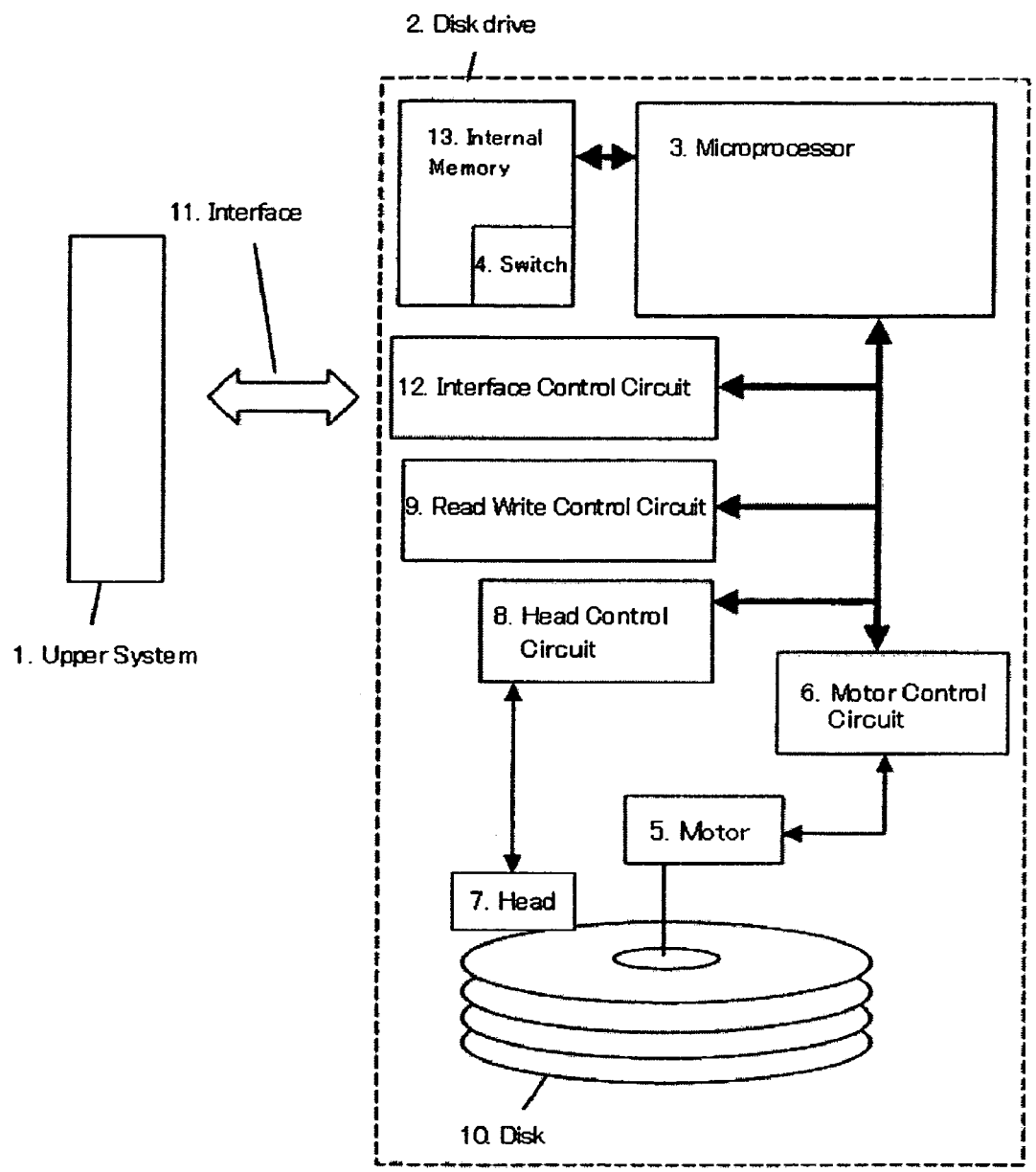
FIG. 2 schematically shows a configuration of a disk drive provided with an internal memory switch according to another embodiment of the present invention.

FIG. 2 schematically shows a configuration of a disk drive having an internal memory switch according to another embodiment of the present invention. A switch in the internal memory 13 of the disk drive 2 in FIG. 2 has the same function as the switch 4 in FIG. 1 and can be set to implement any of the aforementioned operation modes.

When the upper system 1 selects a pseudo failure operation mode via the interface 11 in order to simulate an uncertain composite error resulting from a combination of recoverable and unrecoverable failures, it is necessary to specify a pseudo error type, occurrence count before recovery, the number of times of recovery, and occurrence area. FIG. 3 schematically shows an example of a mechanism 300 to specify to the disk drive embodiment of the present invention how and what pseudo error is to occur.

In a method shown in FIG. 3, a mode page is used to set a pseudo error scenario from the upper system 1. In this mode page setting, byte 2 specifies a pseudo error mode. More concretely, the pseudo logical error report mode, pseudo component circuit failure mode and pseudo interface failure mode functions are individually enabled or disabled there. Bytes 3 through 6 specify what type of pseudo error is to be reported. Byte 7 specifies a command which is to cause the pseudo error. No pseudo error is to be reported when any other command is executed. Bytes 9 through 13 specify how many times the pseudo error is to occur. For example, assume that the upper system 1 is designed to "try a 16-block read three times and, if not recoverable, disconnect the disk drive". For recovery verification in this case, these bytes must be set so as to specify that an error is to occur three times in series before recovery to normal operation. A composite error resulting from recoverable and unrecoverable failures can be simulated by combining error and normal operations in this manner. The last bytes 16 through 23 specify an area in which the pseudo error to occur. Without these bytes, an unexpected phenomenon may arise if the upper system 1 expects a pseudo error to occur in a data area since a pseudo error may occur in a system area managed by the upper system 1. In other words, this area specification also makes it possible to verify the recovery from an error in a system area.

If the pseudo logical error report mode, one of the pseudo failure operation modes, is selected, a microprogram in the microprocessor 3 checks if the area, repeat count and command conditions are met. If met, an error is reported to the upper system 1 in response to the command without performing disk control.

Similarly if the pseudo component circuit failure mode is selected, the microprogram checks if the area, repeat count and command conditions are met. If met, a control constant for the control circuits 6, 8 and 9 is changed to an invalid value according to the error type, i.e., concrete part circuits and the error type, specified by bytes 3 through 6 shown in FIG. 3. For example, a failure in a read/write IC which controls the head input and output can be simulated by setting an invalid value as the head current for write operation. A failure in the motor control circuit 6 may also be simulated to cause fluctuations/abnormalities in the rotation by changing a control value to an invalid value.

If the pseudo interface failure mode is selected, an interface failure with another connected device can be caused by changing a control constant of the interface control circuit 12 to an invalid value.

Since these pseudo failure modes change the control constants of specific electric circuits in the disk drive, it is possible to minimize the man-hour and cost and cover the error/failure modes required by the upper system 1.

According to the present invention, it is possible to artificially generate errors and failures, including failed components circuits, in a disk drive. With a system having plural disk drives connected, it is also possible to artificially generate interface failures with other devices. Advantageously, this makes it possible to verify all retries of the upper system with minimum man-hours and costs.

FIG. 1 and FIG. 2 show embodiments of a disk drive 2 and upper system 1 to which the present invention is applicable. The upper system 1 can diagnose its own functions by setting such parameters as shown in a table of FIG. 3. The present invention can realize a disk drive capable of facilitating the upper system to verify its diagnosis functions.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive having a mechanism to receive a command from an upper system and transmitting an error, the magnetic disk drive comprising:
   a disk
   a motor to rotate the disk;
   a head to read signals from or write signals to the disk;
   a control system to control the motor and the head for reading signals from or writing signals to the disk and to control interface between the magnetic disk drive and the upper system;
   a processor coupled with the control system, the processor having two operation modes including a normal operation mode and a pseudo failure mode in which a pseudo error is reported;
   a selection device to allow selection of one of the two operation modes of the processor; and
   a mechanism to specify in the pseudo failure mode what type of pseudo error is to occur, how many times the pseudo error is to repeat before recovery, the number of times of recovery, and where the pseudo error is to occur.

2. A magnetic disk drive according to claim 1, wherein the mechanism comprises a mode page including data fields to specify in the pseudo failure mode what type of pseudo error is to occur, how many times the pseudo error is to repeat before recovery, the number of times of recovery, and where the pseudo error is to occur.

3. A magnetic disk drive according to claim 2, wherein the mode page further includes one or both of a field to specify a command which is to cause the pseudo error and a field to specify how many times the pseudo error is to occur.

4. A magnetic disk drive according to claim 1, wherein the pseudo error type is selected from the group consisting of pseudo logical error report, pseudo component circuit failure, and pseudo interface failure.

5. A magnetic disk drive according to claim 4, wherein an error is reported to the upper system without performing disk control if the pseudo error type is pseudo logical error report.

6. A magnetic disk drive according to claim 4, wherein the control system comprises an interface control module to control interface with the upper system, a motor control module to control the motor, a head control module to control positioning of the head, and a read write control module to control reading signals from and writing signals to the disk by the head.

7. A magnetic disk drive according to claim 6, wherein a control constant for one or more of the motor control module, the head control module, and the read write control module is changed to an invalid value if the pseudo error type is a pseudo component circuit failure.

8. A magnetic disk drive according to claim 6, wherein a control constant for the interface control module is changed to an invalid value if the pseudo error type is a pseudo interface failure.

9. A magnetic disk drive according to claim 1, further comprising a mechanism to artificially cause a failed electrical component in the pseudo failure mode.

10. A magnetic disk drive according to claim 1, further comprising a mechanism to generate a pseudo error in any of one or more other disk drives connected to the magnetic disk drive.

11. A magnetic disk drive according to claim 1, wherein the operation mode of the processor is switched according to a command from the upper system.

12. A method of diagnosing error-correcting retries of an upper system from a magnetic disk drive receiving a command from the upper system and transmitting an error; the magnetic disk drive comprising a disk, a motor to rotate the disk, a head to read signals from or write signals to the disk, a control system to control the motor and the head for reading signals from or writing signals to the disk and to control interface between the magnetic disk drive and the upper system, and a processor coupled with the control system and having two operation modes including a normal operation mode and a pseudo failure mode in which a pseudo error is reported; the method comprising:
   selecting the pseudo failure mode of the processor to artificially generate error to verify retries of the upper system; and
   specifying in the pseudo failure mode what type of pseudo error is to occur, how many times the pseudo error is to repeat before recovery, the number of times of recovery, and where the pseudo error is to occur.

13. A method according to claim 12, wherein the pseudo error type is selected from the group consisting of pseudo logical error report, pseudo component circuit failure, and pseudo interface failure.

14. A method according to claim 13, wherein an error is reported to the upper system without performing disk control if the pseudo error type is pseudo logical error report.

15. A method according to claim 13,
   wherein the control system comprises an interface control module to control interface with the upper system, a motor control module to control the motor, a head control module to control positioning of the head, and a read write control module to control reading signals from and writing signals to the disk by the head; and wherein a control constant for one or more of the motor control module, the head control module, and the read write control module is changed to an invalid value if the pseudo error type is a pseudo component circuit failure.

16. A method according to claim 13, wherein the control system comprises an interface control module to control interface with the upper system, a motor control module to control the motor, a head control module to control positioning of the head, and a read write control module to control reading signals from and writing signals to the disk by the head; and wherein a control constant for the interface control module is changed to an invalid value if the pseudo error type is a pseudo interface failure.

17. A method according to claim 12, further comprising generating a pseudo error in any of one or more other disk drives connected to the magnetic disk drive.

18. A method according to claim 12, further comprising switching the operation mode of the processor according to a command from the upper system.

\* \* \* \* \*